(12) United States Patent
Gulko et al.

(10) Patent No.: US 9,027,322 B2
(45) Date of Patent: May 12, 2015

(54) METHOD AND SYSTEM FOR USE WITH AN INTEGRATED GASIFICATION COMBINED CYCLE PLANT

(71) Applicant: General Electric Company, Schenectady, NY (US)

(72) Inventors: George Morris Gulko, Houston, TX (US); Pradeep S. Thacker, Bellaire, TX (US); Paul Steven Wallace, Katy, TX (US)

(73) Assignee: General Electric Company, Schenectady, NY (US)

( * ) Notice: Subject to any disclaimer, the term of this patent is extended or adjusted under 35 U.S.C. 154(b) by 95 days.

(21) Appl. No.: 13/833,088

(22) Filed: Mar. 15, 2013

(65) Prior Publication Data

US 2013/0192190 A1    Aug. 1, 2013

Related U.S. Application Data

(62) Division of application No. 12/470,538, filed on May 22, 2009, now Pat. No. 8,418,472.

(51) Int. Cl.
| | |
|---|---|
| *F02C 3/20* | (2006.01) |
| *F02C 6/00* | (2006.01) |
| *F01K 23/10* | (2006.01) |
| *F01K 23/06* | (2006.01) |
| *F22B 1/18* | (2006.01) |
| *F25J 3/04* | (2006.01) |

(52) U.S. Cl.
CPC .............. *F01K 23/10* (2013.01); *F01K 23/067* (2013.01); *F22B 1/1815* (2013.01); *F25J 3/04018* (2013.01); *F25J 3/04545* (2013.01); *F25J 3/04575* (2013.01); *F25J 3/04606* (2013.01); *F25J 3/04618* (2013.01); *F25J 3/04127* (2013.01); *F02C 3/20* (2013.01); *Y02E 20/18* (2013.01); *C10J 2300/0959* (2013.01);
(Continued)

(58) Field of Classification Search
CPC ............. Y02E 20/16; F02C 3/20; F02C 6/18; F01K 23/106
USPC ................... 60/39.12, 39.182, 736, 775, 780, 60/782–783; 48/210
See application file for complete search history.

(56) References Cited

U.S. PATENT DOCUMENTS

| | | |
|---|---|---|
| 3,731,495 A | 5/1973 | Coveney |
| 4,806,136 A | 2/1989 | Kiersz et al. |

(Continued)

FOREIGN PATENT DOCUMENTS

WO      03069132 A1    8/2003

OTHER PUBLICATIONS

Unofficial English translation of CN Office Action dated Dec. 9, 2013 from corresponding Application No. 201010193731.4.

*Primary Examiner* — Gerald L Sung
(74) *Attorney, Agent, or Firm* — Armsrong Teasdale LLP

(57) ABSTRACT

An integrated gasification combined cycle (IGCC) power plant includes an air separation unit configured to discharge a nitrogen flow and an oxygen flow. A first heat exchanger is attached to the air separation unit and heats the discharged nitrogen flow. A second heat exchanger is attached to the air separation unit and heats the discharged oxygen flow. A third heat exchanger is attached to a steam cycle of the IGCC and heats a condensate stream received from the steam cycle. A first adiabatic air compressor is attached to the first, second, and third heat exchangers. The adiabatic air compressor is configured to discharge a compressed air flow comprising a first flow and a second flow. The first flow is channeled to the first and third heat exchangers, and the second flow is channeled to the second and third heat exchangers.

9 Claims, 1 Drawing Sheet

(52) U.S. Cl.
CPC .. *C10J2300/1653* (2013.01); *C10J 2300/1678* (2013.01); *F25J 2230/06* (2013.01); *F25J 2240/70* (2013.01); *F25J 2240/82* (2013.01); *Y02E 20/16* (2013.01)

(56) References Cited

U.S. PATENT DOCUMENTS

| | | |
|---|---|---|
| 5,241,816 A | 9/1993 | Drnevich |
| 5,501,078 A | 3/1996 | Paolino |
| 5,740,673 A | 4/1998 | Smith et al. |
| 5,901,547 A | 5/1999 | Smith et al. |
| 5,979,183 A | 11/1999 | Smith et al. |
| 6,116,052 A | 9/2000 | Ha et al. |
| 6,117,916 A | 9/2000 | Allam et al. |
| 6,214,258 B1 | 4/2001 | Woodward et al. |
| 6,345,493 B1 * | 2/2002 | Smith et al. .............. 60/772 |
| 6,588,212 B1 | 7/2003 | Wallace et al. |
| 7,416,716 B2 | 8/2008 | Allam et al. |
| 8,075,646 B2 | 12/2011 | Briesch et al. |
| 2004/0016237 A1 | 1/2004 | Marin et al. |
| 2008/0226515 A1 | 9/2008 | Allam et al. |
| 2010/0192628 A1 * | 8/2010 | Jibb et al. ................ 62/640 |

* cited by examiner

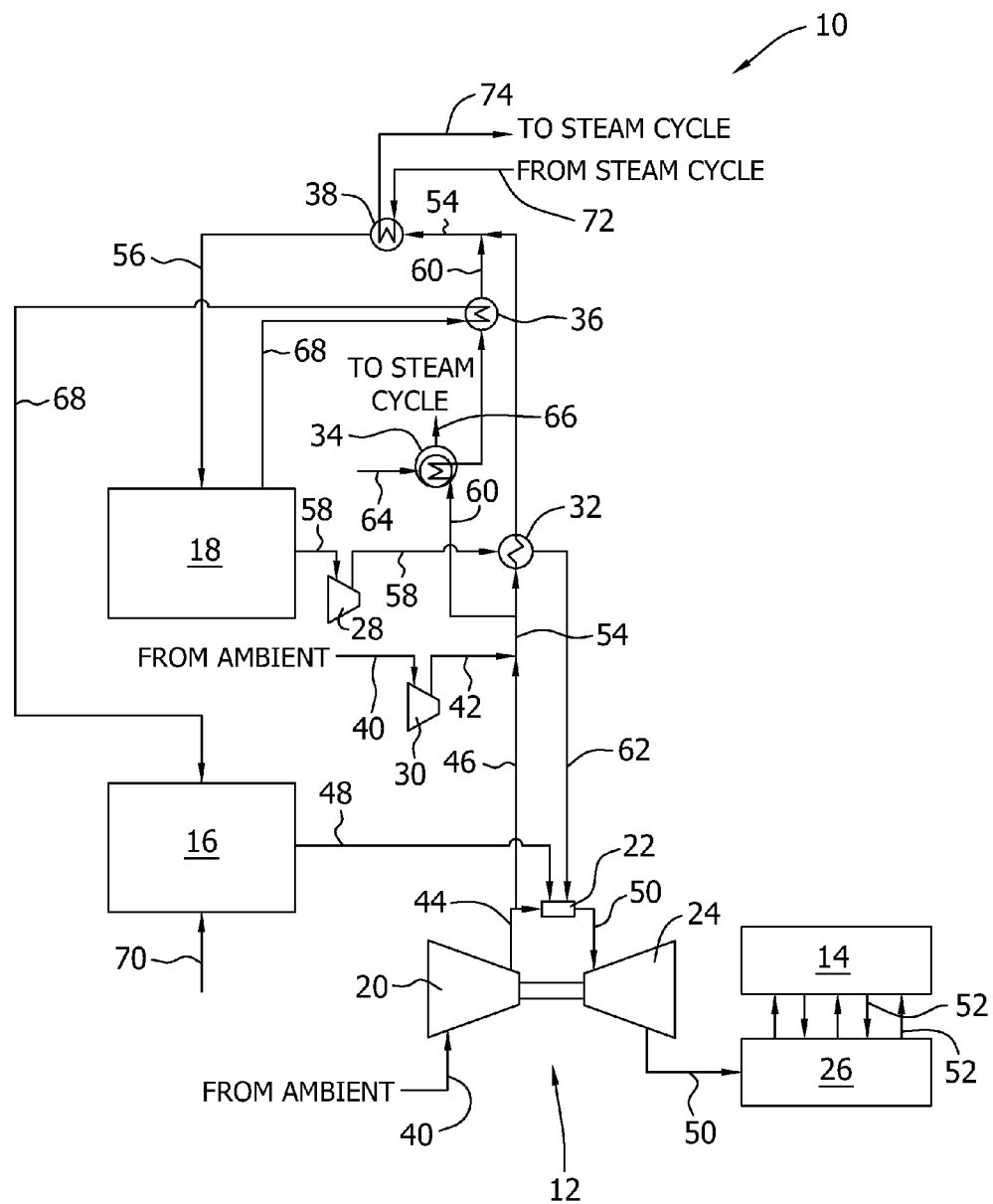

METHOD AND SYSTEM FOR USE WITH AN INTEGRATED GASIFICATION COMBINED CYCLE PLANT

CROSS REFERENCE TO RELATED APPLICATIONS

This application is a divisional of U.S. patent application Ser. No. 12/470,538 filed May 22, 2009, which is hereby incorporated by reference in its entirety.

BACKGROUND OF THE INVENTION

The field of the invention relates generally to an integrated gasification combined cycle (IGCC) system, and more particularly, to an IGCC system that includes an adiabatic axial air compressor.

In at least some known IGCC power plants, hydrocarbonaceous feeds, including low value feeds, are reacted with high purity oxygen, such as approximately 95% oxygen purity, to produce combustion products, including syngas, at a temperature of about 2200° F. to about 2700° F. The resulting syngas is combusted within a combustion turbine to produce electric power.

Moreover, in at least some known IGCC power plants, the oxygen is supplied by an air separation unit (ASU). More specifically, to supply the oxygen from the ASU, air supplied to the ASU is initially compressed using an intercooled air compressor. However, within known intercooled air compressors, thermal energy from each stage of cooling is transferred to cooling water rather than being used within the power plant. Such thermal energy is transferred rather than used within the plant because the thermal energy within the intercooled air compressor is generally below about 200° F. Moreover, the transfer of the thermal energy to the cooling tower requires additional power consumption by the cooling water circuit. Accordingly, a need exists for an IGCC power plant with improved heat efficiency. The embodiments described herein seek to improve the heat efficiency of an IGCC power plant.

BRIEF DESCRIPTION OF THE INVENTION

In one embodiment, a method of operating an integrated gasification combined cycle power generation system is provided. The method includes compressing air in an adiabatic air compressor to produce a compressed heated air stream, heating a nitrogen stream using the compressed heated air stream to produce a heated nitrogen stream and a cooled compressed air stream, and channeling the cooled compressed air stream to an air separation unit.

In another embodiment, a integrated gasification combined cycle (IGCC) power plant is provided. The IGCC power plant includes a first heat exchanger configured to generate steam, an air separation unit configured to discharge a nitrogen flow and an oxygen flow, and a second heat exchanger coupled in flow communication with the air separation unit. The second heat exchanger is configured to heat the discharged nitrogen flow. The IGCC power plant also includes a first adiabatic air compressor coupled in flow communication with the first and second heat exchangers. The first adiabatic air compressor is configured to discharge a compressed heated air flow including a first flow and a second flow, wherein the first flow is channeled to the first heat exchanger and the second flow is channeled to the second heat exchanger.

In yet another embodiment, a steam generation system is provided. The system includes a first adiabatic air compressor for generating a first compressed air flow, a second adiabatic air compressor for generating a second compressed air flow, and a steam generator coupled in flow communication with the first adiabatic air compressor and the second adiabatic air compressor. The first and second compressed air flows generate steam within the steam generator.

The embodiments described herein provide a process and a system for use in operating an integrated gasification combined cycle (IGCC) power generation plant with improved thermal efficiency, as compared to known processes and/or systems for operating an IGCC power plant. Using an adiabatic air compressor to produce a stream of compressed heated air, and to heat a stream of nitrogen, as described herein, facilitates reducing overall power consumption of the IGCC power plant by increasing the thermal efficiency of the plant. More specifically, the systems and processes described herein use an adiabatic air compressor to capture high level heat generated within the IGCC power plant.

BRIEF DESCRIPTION OF THE DRAWINGS

FIG. 1 is a schematic view of an exemplary integrated gasification combined cycle (IGCC) power generation plant.

DETAILED DESCRIPTION OF THE INVENTION

The methods and systems described herein include an adiabatic air compressor for supplying air to an air separation unit. The adiabatic air compressor generates a compressed heated air flow from which thermal energy is recovered within an integrated gasification combined cycle power generation plant. More specifically, in the exemplary embodiment, the compressed, heated air flow is used to heat a diluent nitrogen flow and to produce a medium pressure steam. As such, although an adiabatic air compressor consumes more power than known intercooled air compressors, the thermal energy of the adiabatically compressed air may be recovered, rather than rejected through a cooling tower. Accordingly, the method and system described herein improves overall efficiency of an integrated gasification combined cycle power generation plant as compared to integrated gasification combined cycle power generation plants that use an intercooled air compressor to supply air to an air separation unit.

FIG. 1 illustrates a schematic view of an exemplary integrated gasification combined cycle (IGCC) power generation plant 10 (also referred to herein as "power plant" or "plant"). In the exemplary embodiment, plant 10 includes a gas turbine engine 12, a steam turbine 14, a gasification unit 16, and an air separation unit (ASU) 18. Gas turbine engine 12 includes a compressor 20, a combustor 22, and a turbine 24. In the exemplary embodiment, compressor 20 is an adiabatic axial flow type compressor, and turbine 24 is coupled in flow communication with a heat recovery steam generator (HRSG) 26, which supplies steam to steam turbine 14. HRSG 26 and steam turbine 14 are considered to be a steam cycle. Gasification unit 16 is coupled in flow communication with ASU 18 and combustor 22.

Plant 10 also includes a nitrogen compressor 28, an adiabatic air compressor 30, a first heat exchanger 32, a second heat exchanger 34 a third heat exchanger 36, and a fourth heat exchanger 38. In an alternative embodiment, plant 10 does not include third heat exchanger 36 and/or fourth heat exchanger 38. In the exemplary embodiment, nitrogen compressor 28 may be a single or multi-stage intercooled compressor, and adiabatic air compressor 30 is an adiabatic axial air compressor. Alternatively, compressor 28 and/or compressor 30 may be any suitable compressor that enables plant 10 to function as described herein.

In the exemplary embodiment, nitrogen compressor 28 is coupled in flow communication with ASU 18 and first heat exchanger 32, adiabatic air compressor 30 is coupled in flow communication with ambient, first heat exchanger 32, and second heat exchanger 34. First heat exchanger 32 is coupled in flow communication with nitrogen compressor 28, adiabatic air compressor 30, gas turbine engine compressor 20, combustor 22, and fourth heat exchanger 38. In an alternative embodiment, first heat exchanger 32 is not in flow communication with gas turbine engine compressor 20. In the exemplary embodiment, second heat exchanger 34 is coupled in flow communication with adiabatic air compressor 30, gas turbine engine compressor 20, the steam turbine cycle, and third exchanger 36. Third heat exchanger 36 is coupled in flow communication with ASU 18, gasification unit 16, second heat exchanger 34, and fourth heat exchanger 38. In an alternative embodiment, rather than being in flow communication with ASU 18 and/or gasification unit 16, third heat exchanger 36 is coupled in flow communication with a water source and/or steam source. In the exemplary embodiment, fourth heat exchanger 38 is coupled in flow communication with first heat exchanger 32, third heat exchanger 36, ASU 18, and the steam cycle.

During operation of plant 10, air 40 from ambient enters adiabatic air compressor 30 and is compressed therein. More specifically, in the exemplary embodiment, air 40 is compressed to a pressure of at least 180 pounds per square inch gauge (psig), more particularly, is compressed within a range of about 180 psig to about 250 psig. Air 40 is also heated during the compression process to a temperature in a range of about 750° F. to about 850° F. As used herein, a fluid described herein, such as air, nitrogen, and/or oxygen, is considered to be a fluid flow and/or fluid stream, and the terms "flow" and "stream" are used interchangeable herein.

Air 40 is also channeled from the ambient into gas turbine engine compressor 20 for compression therein. Because compressor 20 is also an adiabatic compressor, compressed air 44 discharged from compressor 20 has similar characteristics, such as pressure and temperature, as compressed air 42 discharged from compressor 30, as described above. As such, when air 46 is extracted from compressed air 44 and channeled from compressor 20 to ASU 18, characteristics of extracted air 46 and compressed air 42 may be controlled such that the two air streams have approximately equal pressures and temperatures. For example, extraction air 46 may have a pressure within a range about 2 to about 15 pounds per square inch (psi) of compressed air 42. In an alternative embodiment, air 40 is pre-processed, depending on ambient conditions, before entering compressor 20.

In the exemplary embodiment, compressed air 44 is channeled to combustor 22 for use in combusting air 44 and fuel, such as syngas 48, therein. Combustion gases 50 are channeled into turbine 24 for generating power, and are discharged from turbine 24 into HRSG 26 to generate steam 52. Steam 52 generated is channeled through steam turbine 14 to generate power.

Extraction air 46 and compressed air 42 are mixed to form a hot, high pressure (HP) air stream 54. Alternatively, air is not extracted from compressed air 44 to form extraction air 46, and only compressed air 42 is channeled to ASU 18. In the exemplary embodiment, HP air stream 54 is channeled to ASU 18 via at least first heat exchanger 32 to generate a cooled HP air stream 56. Further, in the exemplary embodiment, HP air stream 54 is also channeled through heat exchangers 34, 36, and/or 38 to utilize thermal energy in HP air stream 54 after stream 54 heats diluent nitrogen ($N_2$) 58, as described in more detail below. More specifically, HP air stream 54 may have enough thermal energy to heat diluent $N_2$ 58 and at least one other fluid flow. As such, HP air stream 54 may be channeled through more than one heat exchanger to facilitate optimizing the use and recovery of thermal energy within stream 54. After extraction air 46 and compressed air 42 are combined into HP air stream 54, a secondary stream 60 may be extracted from HP air stream 54 to further use/recover the thermal energy of stream 54. Alternatively, secondary air stream 60 is not extracted from HP air stream 54.

In the exemplary embodiment, diluent $N_2$ 58 is used within combustor 22. More specifically, the diluent $N_2$ 58 and a fuel, such as syngas 48, are each channeled to combustor 22 for combustion therein. In one embodiment, heated diluent $N_2$ 58 is mixed with fuel prior to being channeled into combustor 22. In the exemplary embodiment, ASU 18 channels diluent $N_2$ 58 to combustor 22. More specifically, ASU 18 channels the diluent $N_2$ 58 into compressor 28 to compress the $N_2$ 58. Diluent $N_2$ 58 is heated during the compression process. To further heat the diluent $N_2$ 58, the $N_2$ 58 is channeled from compressor 28 through first heat exchanger 32, wherein the thermal energy of HP air stream 54 heats the $N_2$ 58 flowing therethrough. In one example, the diluent $N_2$ 58 is heated to about 750° F., or more generally heated to a range between about 700° F. and about 800° F., by HP air stream 54. As such, heated, compressed diluent $N_2$ 62 is channeled to combustor 22 for combustion therein. After heating the diluent $N_2$ 58 within first heat exchanger 32, in the exemplary embodiment, HP air stream 54 is channeled to fourth heat exchanger 38 and/or ASU 18.

Secondary air stream 60 having approximately the same physical properties, such as pressure and/or temperature, as HP air stream 54 is channeled to second heat exchanger 34. Water and/or low pressure (LP) steam 64 is channeled through second heat exchanger 34 to HRSG 26 to generate superheated steam. As water and/or LP steam 64 is channeled through second heat exchanger 34, secondary air stream 60 heats water and/or LP steam 64 to generate medium pressure (MP) steam 66. More specifically, the thermal energy contained in secondary air stream 60 is used to heat water and/or LP steam 64 and, thus, increase the pressure thereof In one example, when water 64 is supplied to second heat exchanger 34, water 64 is vaporized to a pressure between about 80 psi to about 600 psi. Such steam is considered to be "medium pressure" steam. Such medium pressure steam is then superheated to a temperature between about 600° F. and about 800° F. When LP steam 64 is supplied to second heat exchanger 34, LP steam 64 is supplied at a pressure of between about 80 psi to about 150 psi and is superheated to a temperature between about 600° F. and about 800° F. After secondary air stream 60 generates MP steam 66, secondary air stream 60 is channeled to third heat exchanger 36. Alternatively, secondary air stream 60 is channeled to fourth heat exchanger 38 and/or ASU 18 without flowing through third heat exchanger 36.

In the exemplary embodiment, ASU 18 supplies high pressure oxygen (HP $O_2$) 68 to gasification unit 16 for use in the gasification process performed therein. More specifically, within gasification unit 16 a fuel 70, such as coal, biomass, a hydrocarbonaceous feed, and/or any other suitable fuel, is combined with HP $O_2$ 68 to generate syngas 48 through the gasification process performed therein. Syngas 48 generated is channeled to combustor 22 for combustion therein, as described herein. More specifically, in the exemplary embodiment, to generate HP $O_2$ 68, ASU 18 separates oxygen from air 56. Moreover, ASU 18 separates nitrogen from air to generate diluent $N_2$ 58. More specifically, ASU 18 receives cooled HP air stream 56 and generates HP $O_2$ 68 and diluent $N_2$ 58 therefrom. HP $O_2$ 68 is channeled to gasification unit 16 and diluent $N_2$ 58 is channeled to combustor 22, as described herein.

HP $O_2$ 68 is channeled to gasification unit 16 via third heat exchanger 36. Alternatively, HP $O_2$ 68 is channeled to gasification unit 16 without being channeled through third heat exchanger 36. In the exemplary embodiment, within third heat exchanger 36, thermal energy remaining within secondary air stream 60, after stream 60 is discharged from second heat exchanger 34, is used to heat HP $O_2$ 68. More specifically, as HP $O_2$ is channeled through third heat exchanger 36 heat is transferred from secondary air stream 60 to HP $O_2$ 68. HP $O_2$ 68 is discharged from third heat exchanger 36 to gasification unit 16, and secondary air stream 60 is returned to HP air stream 54. In an alternative embodiment, rather than third heat exchanger 36 being used to heat HP $O_2$ 68, third heat exchanger 36 is used to heat a water flow and/or a steam flow, such as a low pressure steam flow.

In the exemplary embodiment, the re-united HP air stream 54 is channeled through fourth heat exchanger 38. Alternatively, the re-united HP air stream 54 is channeled to ASU 18 without being channeled through fourth heat exchanger 38. In the exemplary embodiment, HP air stream 54 is channeled through fourth heat exchanger 38 to heat a condensate 72 generated in the steam cycle. More specifically, condensate 72 is channeled through fourth heat exchanger 38, and thermal energy of HP air stream 54 is used to heat condensate 72. As such, heated condensate 74 is returned to the steam cycle. In an alternative embodiment, a fluid flow other than condensate 72 is heated within fourth heat exchanger 38. In the exemplary embodiment, cooled, HP air stream 56 is discharged from fourth heat exchanger 38 into ASU 18 for use in generating HP $O_2$ 68 and diluent $N_2$ 58, as described herein.

Moreover, and as described herein, HP air stream 54 is split such that one portion, about 60% to about 90% of stream 54, is used to heat diluent $N_2$ 58, and the remaining portion, about 10% to about 40% of stream 54, is used to heat steam 66 and HP $O_2$ 68. As such, the thermal energy of the hot, HP air stream 54 is utilized to heat a plurality of fluid flows within plant 10 as stream 54 cools. Accordingly, a large portion, such as 85%, of thermal energy within stream 54 is recovered and used to heat diluent $N_2$ 58, HP $O_2$ 68, and/or condensate 72, and/or to generate MP steam 66. The electrical equivalent of the thermal heat recovered from stream 54 is significantly greater than the additional power required for adiabatic air compressor 30. As such, the overall efficiency of plant 10 is higher as compared to the overall efficiency of the known IGCC power plants described above.

Additionally, the above-described power plant realizes an overall increased heat efficiency as compared to power plants that include intercooled compressors. More specifically, for a given air flow, an adiabatic compressor typically requires about 25% more compression power than an intercooled compressor requires. Although compressing air increases the air temperature, the temperature of an air stream compressed in an intercooled compressor is generally below about 200° F. As such, the thermal energy of air discharged from an intercooled compressor is dissipated and/or reduced in a cooling tower, which results in additional power consumption in the cooling water circuit. In contrast, air compressed in an adiabatic compressor is increased to a pressure of between about 180 psig and about 250 psig, and a temperature of between about 750° F. and about 850° F. Using the processes and systems described herein, a large portion, such as more than 85%, of the thermal energy contained in the compressed air stream may be recovered and advantageously used to facilitate heating nitrogen, oxygen, steam turbine condensate, and/or other process flows, and/or to produce medium pressure steam. Accordingly, as would not be expected, using an adiabatic air compressor, such as compressor 30, facilitates increasing a power output of a steam turbine, such as steam turbine 14, and thus, increases a net power output and efficiency of an IGCC power plant, as compared to a net power output of an IGCC power plant using an intercooled air compressor.

Further, the above-described processes and systems may be used with heat exchangers having tight approach temperatures. For example, such processes and systems may be used with approach temperatures lower than approximately 30° F. Moreover, a nitrogen flow within an IGCC plant can be heated to about 750° F. and, if necessary, an oxygen flow within the IGCC plant can also be heated to about 750° F. If the oxygen flow is not heated to approximately the same temperature as the nitrogen flow, a medium pressure steam flow may optionally be generated and/or the nitrogen may be used for regeneration of an ASU molecular sieve may be heated. When the nitrogen is heated, the efficiency of the nitrogen within the regeneration of the molecular sieves is facilitated to be increased.

Exemplary embodiments of methods and systems for use with an integrated gasification combined cycle are described above in detail. The methods and systems are not limited to the specific embodiments described herein, but rather, components of the systems and/or steps of the methods may be utilized independently and separately from other components and/or steps described herein. For example, the methods may also be used in combination with other heat recovery systems and methods, and are not limited to practice with only the integrated gasification combined cycle system and method as described herein. Rather, the exemplary embodiment can be implemented and utilized in connection with many other heat recovery applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An integrated gasification combined cycle (IGCC) power plant comprising:
   an air separation unit configured to discharge a nitrogen flow and an oxygen flow;
   a first heat exchanger coupled in flow communication with said air separation unit, said first heat exchanger configured to heat the discharged nitrogen flow;
   a second heat exchanger coupled in flow communication with said air separation unit, said second heat exchanger configured to heat the discharged oxygen flow;

a third heat exchanger coupled in flow communication with a steam cycle, said third heat exchanger configured to heat a condensate stream received from the steam cycle, and a first adiabatic air compressor coupled in flow communication with said first, second, and third heat exchangers, said first adiabatic air compressor configured to discharge a compressed air flow comprising a first flow and a second flow, wherein said first flow is channeled to said first and third heat exchanger and said second flow is channeled to said second and third heat exchanger.

2. An IGCC power plant in accordance with claim 1 further comprising a gasification unit coupled in flow communication with said air separation unit, said air separation unit configured to discharge said oxygen flow into said gasification unit.

3. An IGCC power plant in accordance with claim 1 further comprising a gas turbine engine comprising a second adiabatic air compressor configured to discharge an extracted compressed heated air flow into said compressed heated air flow.

4. An IGCC power plant in accordance with claim 1 further comprising a heat recovery steam generator coupled in flow communication with said third heat exchanger, said third heat exchanger configured to channel a heated condensate stream to said heat recovery steam generator.

5. An IGCC power plant in accordance with claim 1 further comprising a fourth heat exchanger coupled in flow communication with the steam cycle, said fourth heat exchanger configured to receive said second flow to heat a fluid stream within said fourth heat exchanger.

6. An IGCC power plant in accordance with claim 1 further comprising a compressor coupled in flow communication with said air separation unit, said compressor configured to compress the discharged nitrogen flow.

7. A steam generation system comprising:
a first adiabatic air compressor for generating a first compressed air flow;
a second adiabatic air compressor for generating a second compressed air flow, wherein the second compressed air flow is combined with the first compressed air flow to generate a combined air flow;
a first heat exchanger configured to receive a first discrete portion of the combined air flow and a nitrogen flow;
a second heat exchanger configured to receive a second discrete portion of the combined air flow and an oxygen flow; and
a steam generator coupled in flow communication with said first adiabatic air compressor and said second adiabatic air compressor, wherein said first and second compressed air flows heat a condensate flow to generate steam within said steam generator.

8. A system in accordance with claim 7 further comprising a third heat exchanger coupled in flow communication with said first and second adiabatic air compressors, said third heat exchanger configured to use said first and second compressed air flow to heat a steam cycle condensate flow.

9. A system in accordance with claim 7 further comprising:
a heat recovery steam generator coupled in flow communication with said steam generator; and
a gas turbine engine that comprises said first adiabatic air compressor, said gas turbine engine in flow communication with said heat recovery steam generator, said gas turbine engine configured to discharged a heated fluid flow into said heat recovery steam generator for generating steam therein.

* * * * *